United States Patent
Rantataro (10) Patent No.: US 12,436,147 B1
(45) Date of Patent: Oct. 7, 2025

(54) SENSOR FOR DETECTION

(71) Applicant: Canatu Finland Oy, Vantaa (FI)

(72) Inventor: Samuel Rantataro, Vantaa (FI)

(73) Assignee: CANATU FINLAND OY, Vantaa (FI)

( * ) Notice: Subject to any disclaimer, the term of this patent is extended or adjusted under 35 U.S.C. 154(b) by 0 days.

(21) Appl. No.: 19/064,819

(22) Filed: Feb. 27, 2025

(30) Foreign Application Priority Data

Jul. 15, 2024 (FI) .................................. 20245891

(51) Int. Cl.
*G01N 33/543* (2006.01)
*C12Q 1/6825* (2018.01)

(52) U.S. Cl.
CPC ..... *G01N 33/54373* (2013.01); *C12Q 1/6825* (2013.01); *G01N 2600/00* (2013.01)

(58) Field of Classification Search
None
See application file for complete search history.

(56) References Cited

U.S. PATENT DOCUMENTS

| 2003/0044870 A1 | 3/2003 | Sehr et al. |
| 2020/0231822 A1 | 7/2020 | Jolly et al. |
| 2024/0003877 A1 | 1/2024 | Irudayaraj et al. |

FOREIGN PATENT DOCUMENTS

| CN | 110470721 A | 11/2019 |
| JP | 2005535873 A | 11/2005 |
| JP | 2009002939 A | 1/2009 |
| JP | 2010156605 A | 7/2010 |
| JP | 2020528950 A | 10/2020 |
| KR | 20160083167 A | 7/2016 |
| WO | 2004011672 A1 | 2/2004 |

OTHER PUBLICATIONS

Panagopoulou et al., "Impedimetric Biosensor for the Assessment of the Clotting Activity of Rennet", Anal. Chem. 2010, 82, 8629-8636 (Year: 2010).*

Yu, X., et al. Protein immunosensor using single-walled carbon nanotube forests with electrochemical detection of enzyme labels. In: Molecular biosystems 14.3.2005, vol. 1, 70-78. Abstract, chapter "experimental section" on p. 71.

(Continued)

*Primary Examiner* — Henry H Nguyen
(74) *Attorney, Agent, or Firm* — Robert P. Michal, Esq.; Rimôn PC (57) ABSTRACT

A sensor for determining the presence of at least one target molecule in a sample is disclosed. The sensor includes a layer formed of high aspect ratio molecular structures (HARM-structures); and a blocking layer on the layer formed of HARM-structures, wherein the blocking layer is formed of a plurality of casein micelles, wherein: the casein micelles include primary amines, wherein at least part of the primary amines are functionalized with an amine-reactive crosslinker, and cavities are formed between the plurality of casein micelles. Further, a method for determining the presence of at least one target molecule in a sample is disclosed. Further, a process of preparing a sensor for determining the presence of at least one target molecule in a sample is disclosed. Further, a kit for determining the presence of at least one target molecule in a sample is disclosed.

15 Claims, 5 Drawing Sheets

(56) References Cited

OTHER PUBLICATIONS

Venegas, C.J. et al. Selective Label-Free Electrochemical Aptasensor Based on Carbon Nanotubes for Carbendazim Detection, https://www.mdpi.com/2227-9040/11/2/117. In: Chemosensors. Apr. 2, 2023. vol. 11. Abstract, chapter 2.3.: "fabrication of the aptasensor", scheme 1, p. 6, paragraph 5.

Venkatanarayanan, A., et al. High sensitivity carbon nanotube based electrochemiluminescense sensor array. In: Biosensors and Bioelectronics, Oct. 20, 2011. vol. 31 (2012) p. 233-239. Abstract; p. 237 right col. p. 238 left column.

Casein. In: Wikipedia: https://en.wikipedia.org/wiki/Casein, retrieved Oct. 21, 2024.

Search Report issued by the Finnish Patent and Registration Office in relation to Finnish Application No. 20245891 dated Oct. 22, 2024 (2 pages).

Communication of Acceptance issued by the Finnish Patent and Registration Office in relation to Finnish Application No. 20245891 dated Oct. 22, 2024 (5 pages).

Extended European Search Report issued in corresponding application EP 25155779.9 dated Jul. 24, 2025.

Notification of reasons for refusal issued in corresponding application No. JP2025-029006, dated Jun. 10, 2025, together with English Language translation, provided to US on Jul. 9, 2025.

Pooja Vinod Gaikwad et al., "Detection of the Inflammatory Cytokine IL-6 in Complex Human Serum Samples Via Rational Nanotube Surface Passivation Screening", ECS Meeting Abstracts, 2023, vol. MA2023-01, No. 9, p. 1124-1126.

Samuel Rantataro et al., "Next-generation carbon nanotube electrochemical sensors for liquid biopsy applications", Electrochemistry Communications, vol. 177, pp. 1-8 (2025).

* cited by examiner

SENSOR FOR DETECTION

CROSS-REFERENCE TO RELATED APPLICATIONS

This application claims priority to Finnish Patent Application No. 20245891, filed Jul. 15, 2024, the disclosure of this application is expressly incorporated herein by reference in its entirety.

FIELD OF THE INVENTION

The present disclosure relates to a sensor for determining the presence of at least one target molecule in a sample. The present disclosure further relates to a method for determining the presence of at least one target molecule in a sample. The present disclosure further relates to a process for preparing the sensor. The present disclosure further relates to a kit for determining the presence of at least one target molecule in a sample.

BACKGROUND OF THE INVENTION

Biological sensors detect target biomolecules by using a biological recognition element, such as an antibody or aptamer, which interacts with a target biomolecule. The interaction is detected and measured through various means, such as through an electrical, an optical, or a thermal signal. Modern sensors involve the use of nanostructures, which provide a large surface area and enhanced electronic properties, facilitating rapid and accurate signal transduction. However, nanostructures may non-specifically interact with biomolecules and decrease the sensitivity of an assay and result in false positives, or worse the biomolecules may block the sensor surface completely and disable the sensor. Thus, there is still a need for a more sensitive sensor.

SUMMARY OF THE INVENTION

A sensor for determining the presence of at least one target molecule in a sample is disclosed. The sensor comprises:
  i. a layer formed of high aspect ratio molecular structures (HARM-structures), wherein the layer formed of HARM-structures is configured to generate an electrical signal when in contact with signal molecules indicating the presence of the at least one target molecule when an electrical potential is applied to the sensor, wherein the magnitude of the electrical signal correlates with the concentration of the at least one target molecule in the sample; and
  ii. a blocking layer on the layer formed of HARM-structures, wherein the blocking layer is formed of a plurality of casein micelles, wherein:
  the casein micelles comprise primary amines, wherein at least part of the primary amines is functionalized with an amine-reactive-crosslinker thereby providing at least one linkage group for allowing binding thereto, and
  cavities are formed between the plurality of casein micelles for allowing the signal molecules to diffuse through the blocking layer to the layer formed of HARM-structures such as to generate the electrical signal.

Further, a method for determining the presence of at least one target molecule in a sample is disclosed. The method comprises:
  contacting the sensor as disclosed in the current specification with a biorecognition element bound to the linkage group with the sample, thereby allowing the binding of the at least one target molecule thereto;
  contacting the sensor with at least one detection probe that can selectively bind to the at least one target molecule thereby allowing the binding of the at least one detection probe to the at last one target molecule;
  subjecting the sensor to an enzyme linked analysis to yield signal molecules, which indicate the presence of the at least one target molecule, wherein the signal molecules diffuse through the blocking layer to the layer formed of HARM-structures, whereby an electrical signal is generated and quantified with means to measure the electrical signal; and
  determining the concentration of the at least one target molecule in the sample based on the quantified electrical signal.

Further, a process of preparing a sensor for determining the presence of at least one target molecule in a sample is disclosed. The process comprises:
  i. providing a layer formed of HARM-structures;
  ii. providing a blocking layer on the layer formed of HARM-structures, wherein the blocking layer is formed of a plurality of casein micelles, wherein the casein micelles comprise primary amines;
  iii. functionalizing at least part of the primary amines with an amine-reactive-crosslinker, thereby providing at least one linkage group for allowing binding thereto.

Further, a kit for determining the presence of at least one target molecule in a sample is disclosed. The kit comprises:
  a sensor as disclosed in the current disclosure and at least one biorecognition element that can selectively bind to the at least one target molecule, or a sensor as disclosed in the current specification with a biorecognition element bound to the linkage group;
  at least one detection probe that can selectively bind the at least one target molecule; and
  instructions for use.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

The present disclosure relates to a sensor for determining the presence of at least one target molecule in a sample. The sensor comprises:

i. a layer formed of high aspect ratio molecular structures (HARM-structures), wherein the layer formed of HARM-structures is configured to generate an electrical signal when in contact with signal molecules indicating the presence of the at least one target molecule when an electrical potential is applied to the sensor, wherein the magnitude of the electrical signal correlates with the concentration of the at least one target molecule in the sample, and ii. a blocking layer on the layer formed of HARM-structures, wherein the blocking layer is formed of a plurality of casein micelles. Wherein:

the casein micelles comprise primary amines, wherein at least part of the primary amines is functionalized with an amine-reactive-crosslinker thereby providing at least one linkage group for allowing binding thereto, and cavities are formed between the plurality of casein micelles for allowing the signal molecules to diffuse through the blocking layer to the layer formed of HARM-structures such as to generate the electrical signal.

With such a sensor, the layer formed of HARM-structures is blocked with a plurality of casein micelles which prevents non-specific binding of biomolecules such as DNA, RNA, proteins, enzymes, or other biomolecules and allows for accurate detection of target molecules. The blocking layer may comprise a plurality of casein micelles. The casein micelles may be of varied sizes and form varied interactions with other casein micelles or the layer formed of HARM-structures. The casein micelles should maintain their micellar form to prevent non-specific binding and to allow for accurate detection of target molecules. Complete blocking of the layer formed of HARM-structures would prevent the layer formed of HARM-structures from interacting with signal molecules. Thereby, the blocking layer may also comprise cavities that are formed between the plurality of casein micelles for allowing the signal molecules to diffuse through the blocking layer to the layer formed of HARM-structures. The casein micelles may further be functionalized with varied click-chemistry molecules that can bind to the primary amines on the surface of the casein micelles. This may allow covalent or non-covalent linkage of biorecognition elements to the casein micelles, without compromising the blocking layer's ability to prevent non-specific binding of the target molecules. The sensor may be multiplexed, i.e. the sensor may be used to determine at least one or a plurality of target molecules in a sample.

The present disclosure further relates to a method for determining the presence of at least one target molecule in a sample. The method comprises:

contacting the sensor, with a biorecognition element bound to the linkage group according to as disclosed in the current specification, with the sample, thereby allowing the binding of the at least one target molecule thereto.

contacting the sensor with at least one detection probe that can selectively bind to the at least one target molecule thereby allowing the binding of the at least one detection probe to the at last one target molecule.

subjecting the sensor to an enzyme linked analysis to yield signal molecules, which indicate the presence of the at least one target molecule, wherein the signal molecules diffuse through the blocking layer to the layer formed of HARM-structures, whereby an electrical signal is generated and quantified with means to measure the electrical signal. And determining the concentration of the at least one target molecule in the sample based on the quantified electrical signal.

It should be understood that washing with an appropriate buffer may occur between the above steps to improve sensitivity of the determining thereof.

With such a method, the amount of the at least one target molecule may be quantified by quantifying the amount of the signal molecules. In the method a sensor with biorecognition element already bound in the sensor may be used. Optionally, a sensor and at least one biorecognition element are provided separately and before proceeding with the method, the sensor should be contacted with the biorecognition element. The method as described is specific to the at least one target molecule and may provide a quantitative measure of the concentration of the at least one target molecule. When the signal molecules are in contact with the layer formed of HARM-structures an electrical signal is generated and may be quantified with means to measure an electrical signal. The amount of the at least one target molecule may be relative to the quantitative measurement of the electrical signal (e.g. the amount of signal molecules). Due to the sensor comprising a layer formed of HARM-structures and a blocking layer of a plurality of casein micelles, the quantification is sensitive and non-specific binding of the molecules in the sample, the at least one target molecule, the at least one biorecognition element, the at least one detection probe, or any constituents of the enzyme linked analysis to the HARM-structures may be prevented by the blocking layer of a plurality of casein micelles.

The present disclosure further relates to a process of preparing a sensor for determining the presence of at least one target molecule in a sample. The process comprises:

i. providing a layer formed of HARM-structures.

ii. providing a blocking layer on the layer formed of HARM-structures, wherein the blocking layer is formed of a plurality of casein micelles, wherein the casein micelles comprise primary amines.

iii. functionalizing at least part of the primary amines with an amine-reactive-crosslinker, thereby providing at least one linkage group for allowing binding thereto.

With such a process, a sensitive sensor comprising a layer formed of HARM-structures and a functionalized blocking layer of the plurality of casein micelles may be provided or prepared. The produced sensor may be multiplexed.

The present disclosure further relates to a kit for determining the presence of at least one target molecule in a sample. The kit comprises:

a sensor as disclosed in the current disclosure and at least one biorecognition element that can selectively bind to the at least one target molecule, or a sensor as disclosed in the current specification with a biorecognition element bound to the linkage group.

at least one detection probe that can selectively bind the at least one target molecule, and instructions for use.

With such a kit, the at least one target molecule may be quantified from a sample, or the kit may be used determine the presence of at least one target molecule in a sample.

The sensor comprises a layer formed of HARM-structures. The layer formed of HARM-structures may be a conductive layer of HARM-structures. In the context of this specification, the expression "HARM-structures" should be understood in this specification, unless otherwise stated, as referring to "nanostructures", i.e. structures with one or more characteristic dimensions in nanometre scale, i.e. less or equal than about 100 nanometres. "High aspect ratio"

refers to dimensions of the conductive structures in two perpendicular directions being in significantly different magnitudes of order. For example, a nanostructure may have a length which is tens or hundreds or thousands of times higher than its thickness and/or width. In a layer formed of HARM-structures, a great number of said nanostructures are interconnected with each other to form a network of interconnected molecules. As considered at a macroscopic scale, a HARMS network forms a solid, monolithic material in which the individual molecular structures are disoriented or non-oriented, i.e. are oriented substantially randomly, or oriented.

In one embodiment, the HARM-structures are electrically conductive HARM-structures. In one embodiment, the HARM-structures are carbon nanostructures. In one embodiment, the HARM-structures comprise carbon nanotubes (CNT), carbon nanobuds (CNB), carbon nanoribbons, or any combination thereof. In one embodiment, the HARM-structures comprise carbon nanotubes and/or carbon nanobuds. In one embodiment, the HARM-structures comprise carbon nanotubes. The carbon nanobuds, or the carbon nanobud molecules as they also may be called, have fullerene or fullerene-like molecules covalently bonded to the side of a tubular carbon molecule.

In one embodiment, the HARM-structures comprise or are nanostructures made of carbon, gold, silver, graphene, or conductive polymers. In one embodiment, the HARM-structures comprise or are metal nanowires, such as silver nanowires and or gold nanowires.

In one embodiment, the layer formed of HARM-structures is attached to a support.

The support may be any type of support suitable to be attached with a layer of HARM-structures. The support may be formed of a polymer, a metal, silicon, glass, a ceramic material, or any combination thereof. In one embodiment, the layer formed of HARM-structures is deposited on a substrate. The substrate may act as support.

The form of the support may vary. The support may have the form of a frame. In one embodiment, the support has the form of a frame, and the layer formed of HARM-structures is a free-standing layer formed of HARM-structures attached to the frame. The frame may support the free-standing layer formed of HARM-structures at the outer edges thereof such that an unsupported standalone region of the free-standing layer formed of HARM-structures is formed. The support positions may be located anywhere in the structure as long as they provide sufficient support for the free-standing layer formed of HARM-structures. For example, they may be on the sides of the free-standing layer formed of HARM-structures, or in areas near corners, or next to each other along the sides. Any wider area that includes a plurality of support points is also meant to be covered by this aspect, for example if the frame has an uninterrupted circular shape wherein the free-standing region lies within the circle. The frame may also have any other prolonged uninterrupted shape. In one embodiment, the frame is shaped as a circle, a square, a triangle, a rectangle, an oval, or a polygon. The support may be a solid support on which a layer formed of HARM-structures is provided. The support may be a mesh on which a layer formed of HARM-structures is provided. The HARM-structures may be transferred to a ready-made mesh, or the mesh may be formed after the layer formed of HARM-structures is formed. The sensor may have an electrical potential or an electrical current applied to it. The electrical potential may be negative. Electrical potential enables the layer formed of HARM-structures to generate an electrical signal in the presence of a signal molecule. The electrical signal may be measured by varied means. The electrical signal may be measured by means selected from the group amperometry, potentiometry, conductometry, voltammetry, coulometry, impedimetric methods or chronoamperometry. As the HARM-structures may be conductive, or conductive and capable of driving electrochemical reactions, when an electrochemical substance is in contact with the layer formed of HARM-structures a transfer of electrons occurs, which may cause changes in electrical current, electrical signal, electrical potential and/or impedance of the sensor. The sensor coupled with means to measure electrical signal may be used to quantify the concentration of the signal molecule. Several means may be used to measure an electrical signal, such as for example amperometry or voltammetry methods. When the sensor is used to determining the presence of the at least one target molecule in a sample, the concentration of the signal molecule measured with the means to measure current may correlate with the concentration of the at least one target molecule in the sample.

In the context of this specification, the term "sensor" may refer to a device or component that detects, measures, or records biological substances, such as molecules. The sensor may be an electrode or a biosensor. The sensor may comprise a layer formed of HARM-structures and a blocking layer. The sensor may be multiplexed.

In one embodiment, the sensor is configured for determining the presence of at least one target molecule in a sample. In one embodiment, the sensor is configured for determining the presence of one target molecule in a sample. In one embodiment, the sensor is configured for determining the presence of a plurality of target molecules in a sample. In one embodiment, the sensor is a biosensor. In one embodiment, the sensor is an electrode.

In an embodiment, the at least one target molecule comprises or is a single stranded DNA-molecule, a single stranded RNA-molecule, a double stranded DNA-molecule, a double stranded RNA-molecule, a protein, a peptide, a lipid, a hormone, a pathogen, or a pharmaceutical compound. In an embodiment, the at least one target molecule is selected from a group consisting of: a single stranded DNA-molecule, a single stranded RNA-molecule, a double stranded DNA-molecule, a double stranded RNA-molecule, a protein, a peptide, a lipid, a hormone, a pathogen, and a pharmaceutical compound. In an embodiment, the plurality of target molecules are independently selected from a group consisting of: a single stranded DNA-molecule, a single stranded RNA-molecule, a double stranded DNA-molecule, a double stranded RNA-molecule, a protein, a peptide, a lipid, a hormone, a pathogen, and a pharmaceutical compound.

In the context of this specification, the "target molecule" may refer to a molecule of interest that may be for example a biomolecule indicative of health, indicative of disease or condition, indicative of infection (i.e. pathogen or toxin), or in some other way beneficial to quantify. The target molecule may be for example a single stranded DNA-molecule, a single stranded RNA-molecule, a double stranded DNA-molecule, a double stranded RNA-molecule, a protein, a peptide, an enzyme, a metabolite, a lipid, a carbohydrate, a hormone, a pathogen, a toxin, or a pharmaceutical compound.

In the context of this specification, the "signal molecule (s)" may refer to a molecule that has undergone an oxidation or reduction reaction, thereby being in an oxidised or reduced state, facilitating a transfer of electrons when in contact with a layer formed of HARM-structures. The signal molecule may be yielded when an enzyme catalyses its substrate. The signal molecule may be generated by an enzyme. The signal molecule may be catalysed by an enzyme. For example, the signal molecules may be an oxidised benzidine such as 3,3',5,5'-Tetramethylbenzidine or 3,3'-Diaminobenzidine, 2,2'-Azino-bis(3-ethylbenzothiazoline-6-sulfonic acid), o-Phenylenediamine dihydrochloride, p-Nitrophenylphosphate, 5-Bromo-4-chloro-3-indolyl phosphate/Nitro blue tetrazolium, ferrocyanide, ferricyanide, hydrogen peroxide, Luminol or Amplifu Red. There are several alternatives for signal molecules.

In the context of this specification, the expression "a plurality of casein micelles" or "casein micelles" may refer to colloidal spherical aggregates of casein proteins, calcium phosphate, and water commonly found in bovine milk. The casein proteins are a family of phosphoproteins comprising caseins αS1, αS2, β, and κ. The casein proteins are capable of forming a spherical protein and calcium phosphate complex (a micelle) comprised of varying ratios of the casein proteins. The casein proteins may form linear and branched chains through varied protein-protein interactions and protein-calcium phosphate interactions. The outmost layer of a casein micelle may be rich in kappa-casein, which is relatively more hydrophilic, whereas the inner complex may comprise more of alpha- and beta-caseins which are relatively more hydrophobic; overall, casein micelles may comprise various compositions of casein proteins. Casein micelles can be extracted from bovine milk in varying sizes and a milk or a casein extract may be filtered for specific casein micelle size. To be able to form casein micelles, the casein proteins should be in a native state (e.g. in the functional state, where the protein maintains a natural three-dimensional structure). The casein proteins may not be denatured, as that may result in the casein micelle structure or antifouling characteristics of the casein micelles being altered. The "the casein micelles" or the "plurality of casein micelles" should be understood such that a casein micelle has a quaternary structure that comprises the casein proteins, calcium phosphate, and water. The quaternary structure may not be fully functional if the casein proteins are denatured or crosslinked or the casein micelles are brought into contact with an emulsifier or a detergent. The casein micelles may be non-conductive.

The expression that the blocking layer is "on" the layer formed of HARM-structures should be understood in the context of this specification, unless otherwise stated, as meaning that the blocking layer formed of a plurality of casein micelles is bound upon or bound on the surface of the layer formed of HARM-structures.

In the context of this specification, the expression "layer" may refer to a structure having its lateral dimensions substantially larger than its thickness. In that sense, the layer may be considered being a "thin" structure. A layer as a structure may be porous, channelized, permeable uneven, non-uniform, or formed of multiple subunits, such as casein micelles, in a non-ordered manner. A layer as a structure may further be even, impermeable, solid, or sealed.

In the context of this specification, the expression "blocking layer" may refer to a layer which serves to impede non-specific binding of molecules. The blocking layer may reduce current leakage. The blocking layer may improve sensitivity of the sensor. The blocking layer may reduce the available reactive surface area or decrease electrochemical rate, leading to decrease of current amplitude detected on the sensor compared to non-blocked sensor. The blocking layer may also improve sensitivity of the sensor. The blocking layer may be formed of a plurality of casein micelles. The blocking layer may be non-conductive.

In the context of this specification, the expression "conductive" may refer to the ability of a material or component to allow the flow of an electrical current or an electrical signal through it with minimal resistance.

In the context of this specification, the expression "non-conductive" may refer to the property of a material or component that resists the flow of electrical current or electrical signal, effectively acting as an insulator.

In the context of this specification, the expression "antifouling" may refer to the property of a substance to resist binding to its surface. For example, the casein micelles or the blocking layer thereof may be antifouling against other proteins, enzymes nucleic acids, but also biomolecules including, but not limited to, biotin.

The casein micelles, when used as a blocking layer on the layer formed of HARM-structures, primarily interact with either the HARM-structures, or casein micelles, calcium phosphate or water, not other molecules, i.e. that casein micelles are antifouling supramolecules against proteins, enzymes, nucleic acids, but also other biomolecules including, but not limited to, biotin. The casein micelles may be firmly bound to the HARM-structures. The casein micelles may be bound to the HARM-structures by either covalent or non-covalent means. The casein micelles may sterically block other molecules from reaching the layer formed of HARM-structures.

Further, the surface proteins of the casein micelles may comprise a number of functional groups including primary amines. Some of the functional groups may be needed for interaction with other casein proteins, for the cohesion of the micelles, for interaction with the layer formed of HARM-structures or for the stability of the blocking layer. The primary amines may be functionalized with click-chemistry compounds, such as with an amine-reactive crosslinker, without compromising the casein micelle's ability to bind other casein micelles or the layer formed of HARM-structures or affecting the blocking layers antifouling properties. In one embodiment, the casein micelles are non-conductive. In one embodiment, the blocking layer is non-conductive. In one embodiment, the blocking layer does not contribute to the electrochemical reaction occurring on the sensor surface. In one embodiment, the blocking layer is non-conductive and does not contribute to the electrochemical reaction occurring on the sensor surface.

The plurality of casein micelles, when bound on the layer formed of HARM-structures, form cavities. The cavities allow the signal molecules to diffuse through the blocking layer to the layer formed of HARM-structures such as to generate the electrical signal or current, while simultaneously preventing the non-specific binding of other molecules to the layer formed of HARM-structures. The binding of HARM-structures to casein micelles and the formation of a porous blocking layer or cavities thereof may not require chemical or physical treatment of micelles. Thereby, the surface of the layer formed of HARM-structures may be blocked with casein micelles to prevent non-specific binding of molecules with the added ability of having diffusion cavities and the possibility to functionalize said casein micelles with, for example, click chemistry compounds.

In the context of this specification, the expression "cavities" may refer to distinct paths through which a particle or a molecule may pass through the blocking layer formed of casein micelles. The casein micelles may form cavities when interacting with other casein micelles or the layer formed of HARM-structures. The cavities may be through holes. The cavities may be channels. The cavities may form a direct path to the layer formed of HARM-structures, or they may be uneven or winding, creating a more complex passage that may follow a non-linear route to the layer formed of HARM-structures. It should be understood that for cavities to form, at least some of the casein micelles may be bound in a way which allows the formation thereof; however, not all casein micelles in a blocking layer may participate in forming cavities.

In the context of this specification, the expression "click chemistry" may refer to utilizing chemical compounds to join two molecular entities together. For example, in the case of proteins, a specific functional group in an amino acid side chain may be brought into contact with a compound that may covalently bind the specific functional group. The functional groups present in the compound are then bound to the protein thereof facilitating a further linking of another molecule. The compound may be for example an amine-reactive-crosslinker that binds to primary amines in lysine residues or to the N-terminal amine of the protein and introduces a further functional group (a linkage group). Another molecule, with the appropriate functionalization, may bind the linkage group and be thereby covalently bound to the protein.

In the context of this specification, the expression "amine-reactive-crosslinker" may refer to chemical compounds that can covalently bind to primary amines and introduce a linkage group such as an azide, a carbohydrate, a carboxyl, a phosphine or a sulfhydryl group. The amine-reactive crosslinker may have further chemical qualities such as being cleavable or non-cleavable by cleavage enzymes or soluble or insoluble in water. The choice of which click-chemistry to use is situation dependant (i.e. some target molecules are best captured by specific click-chemistries), which are known to a person skilled in the art.

In the context of this specification, the expression "linkage group" may refer to the functional group provided by a crosslinking molecule, such as an amine-reactive crosslinker. The linkage group may be, for example, a thiol group, an amine group, an maleimide group, an azide group, or epoxy group.

In the context of this specification, the expression "functionalized" may refer to a chemical reaction where a molecule, such as DNA, RNA, or a protein, being treated with click-chemistry compounds for crosslinking such as to provide a specific functional group to the molecule. The functional group might be introduced by for example a maleimide linker, an azide linker, an alkyne linker or a thiol linker or by click-chemistry specific cross linkers or reagents. In the context of this specification, the functionalization is compatible with the amine-reactive-crosslinker user and therefore can provide a bond with the linkage group as part of the same click chemistry.

In the context of this specification, the expression "biorecognition element" may refer to a biorecognition element that is compatible with the amine-reactive-crosslinker. The biorecognition element may be chemically or biologically modified (i.e. functionalized) to be compatible with the amine-reactive crosslinker. The biorecognition element may comprise a functional group compatible with the amine-reactive crosslinker without chemical or biological modification. If, for example, the amine-reactive-crosslinker is an amine-to-thiol crosslinker, the biorecognition element may be thiolated DNA. The biorecognition element may be a functionalized biorecognition element. The biorecognition element may be for example a functionalized oligonucleotide probe, a functionalized nucleotide probe, a functionalized DNA probe, a functionalized RNA probe, an antibody, a functionalized antibody, a bispecific antibody, a functionalized bispecific antibody, an antibody fusion protein, a functionalized antibody fusion protein, an antibody fragment thereof, a functionalized antibody fragment thereof, or a functionalized molecularly imprinted polymer.

In the context of this specification, the expression "probe" may refer to a single or double stranded nucleotide or oligonucleotide sequence specific or having high affinity for a target nucleotide sequence. A probe may be an aptamer.

In the context of this specification, the expression "antibody" may refer to a protein that specifically binds or has a high affinity for a target protein. An antibody may be a monoclonal antibody, a polyclonal antibody, or a humanized antibody. In the context of antibodies, the disclosure may refer to a single-chain variable fragment or antibody fragment thereof meaning the specific binding region of the antibody. The specific binding region of the antibody may be for example conjugated to another protein.

In one embodiment, the amine-reactive crosslinker has a molecular length of 1-20 Å, or 1-50 Å, or 1-100 Å, or 1-10 000 Å, or 2-20 000 Å. In one embodiment, the amine reactive crosslinker is selected from a group consisting of an amine-to-amine crosslinker, amine-to-sulfhydryl crosslinker, an amine-to-phosphine crosslinker, an amine-to-alkyne crosslinker, an amine-to-azide crosslinker, an amine-to-streptavidin crosslinker, an amine-to-biotin crosslinker, or an amine-to-carboxyl crosslinker. In one embodiment, the amine-reactive-crosslinker is an amine-to-sulfhydryl crosslinker. In one embodiment, the amine-reactive-crosslinker is N-γ-maleimidobutyryl-oxysuccinimide ester.

The casein micelles may be efficient at preventing the binding of nucleotides (DNA/RNA) to the layer formed of HARM-structures. For example, DNA has a mild negative charge and spontaneously non-specifically binds HARM-structures, preventing the use of the sensor due to high background currents with or without the presence of the target molecule. The casein micelles may prevent the non-specific binding of nucleotides, while still enabling the diffusion of molecules smaller than the cavity width (such as the signal molecules) to the surface of the layer formed of HARM-structures. The casein micelles may be especially beneficial for preventing the non-specific binding of DNA and RNA to the layer formed of HARM-structures. Further, the blocking layer formed of a plurality of casein micelles also may prevent the non-specific binding of proteins, enzymes, peptides, and other biomolecules to the layer formed of HARM-structures.

The casein micelles of a specific size may be suited to block nanoporous HARM-structures with a specific pore diameter. It should be understood that the size of the best performing casein micelles depends on the size of the pore diameter of the HARM-structures thereof. Commonly nanomaterials have a pore diameter between 1-200 nm. For example, nanoporous HARM-structures with a pore diameter of 30 nm may be beneficially blocked with casein micelles with a diameter in the range of 0.5-30 nm. Thereby, blocking the layer formed of HARM-structures with a pore diameter of approximately 30 nm with casein micelles with a diameter in the range of 0.5-30 nm, or 2-10 nm, may result in a sensor that is more sensitive than when using casein micelles with a diameter in the range of up to 450 nm. A more sensitive sensor may allow detection of target molecules even in very small concentrations, which may allow for example detection of DNA from a patient sample without having to perform an DNA enrichment or amplification procedure. In one embodiment, the diameter of the casein micelles is selected based on the pore diameter of the layer formed of HARM-structures. In one embodiment, the pore diameter of the layer formed of HARM-structures is in the range of 1-200 nm and the casein micelles have a diameter in the range of 0.5-200 nm, or 0.5 nm-100 nm, or 0.5-30 nm, or 0.7-20 nm, or 1-15 nm, or 2-10 nm. In one embodiment, the pore diameter of the layer formed of HARM-structures is 30 nm and the casein micelles have a diameter in the range of 0.5-30 nm, or 0.7-20 nm, or 1-15 nm, or 2-10 nm.

It should be understood, that while casein micelles may be filtered for a specific size, some casein micelles may not be of that size as filtering is not usually perfect and has some filtering method specific error rate. Therefore, it should be understood that when a size range is discussed not all casein micelles may fall within the size range, but a majority do. The blocking layer may not be dependent on every casein micelle being of a particular size, however the blocking layer is more effective when most casein micelles fall within a preferable size range. It should be understood that a portion of casein micelles being larger or smaller than the preferable size range may not impede the function of the sensor but may reduce the sensitivity of said sensor.

In one embodiment, the casein micelles have a diameter in the range of 0.5-450 nm, or 0.5-200 nm, or 0.5 nm-100 nm, or 0.5-30 nm, or 0.7-20 nm, or 1-15 nm, or 2-10 nm. In one embodiment, the casein micelles have a diameter in the range of 0.5-30 nm, or 0.7-20 nm, or 1-15 nm, or 2-10 nm. In one embodiment the casein micelles have a diameter in the range of 0.5-30 nm, or 0.7-20 nm, or 1-25 nm, or 1-15 nm, or 1-10 nm, or 2-30 nm, or 2-20 nm, or 2-10 nm. In one embodiment, at least 1%, or at least 5%, or at least 10%, or at least 20%, or at least 30%, or at least 40%, or at least 50%, or at least 60%, or at least 70%, or at least 80%, or at least 90%, or at least 95%, or at least 99% or essentially all of the casein micelles have a diameter in the range of 0.5-30 nm, or 0.7-20 nm, or 1-15 nm, or 2-10 nm. In one embodiment, at least 60%, or at least 70%, or at least 80%, or at least 90%, or at least 95%, or at least 99% or essentially all of the casein micelles have a diameter in the range of 0.5-30 nm, or 0.7-20 nm, or 1-15 nm, or 2-10 nm. In one embodiment, at least 60%, or at least 70%, or at least 80%, or at least 90%, or at least 95%, or at least 99% or essentially all of the casein micelles have a diameter in the range of 0.5-30 nm, or 0.7-20 nm, or 1-25 nm, or 1-15 nm, or 1-10 nm, or 2-30 nm, or 2-20 nm, or 2-10 nm. In one embodiment, at least 1%, or at least 5%, or at least 10%, or at least 20%, or at least 30%, or at least 40%, or at least 50%, or at least 60%, or at least 70%, or at least 80%, or at least 90%, or at least 95%, or at least 99% or essentially all of the casein micelles have a diameter in the range of 0.5-30 nm, or 0.7-20 nm, or 1-25 nm, or 1-15 nm, or 1-10 nm, or 2-30 nm, or 2-20 nm, or 2-10 nm.

In the context of this specification, the term "uniform" or "essentially uniform" may refer to objects that are of the same size, or where majority of objects are of the same size. Objects of the same size may be provided by filtering. Filtering may be imperfect. Conversely, the term "non-uniform" may refer to each object having an individual size which may be different from other objects.

Using casein micelles of uniform size or non-uniform size may affect the structure of the blocking layer. Using uniform size casein micelles of sub 2 nm diameter on a layer of HARM-structures may hamper the formation of cavities for signal molecules. Whereas, using non-uniform size casein micelles may allow the use of even very small casein micelles, such as casein micelles with sub 2 nm diameter, such as with a diameter in the range of 0.5-30 nm, while leaving diffusion cavities for signal molecules. In one embodiment, the casein micelles are of essentially uniform size or of non-uniform size. In one embodiment, the casein micelles are of uniform size and have a diameter in the range of 2-30 nm, or 2-20 nm, or 2-10 nm. In one embodiment, the casein micelles are of non-uniform size and have a diameter in the range of 0.5-30 nm, or 0.7-20 nm, or 1-25 nm, or 1-15 nm, or 1-10 nm, or 2-10 nm.

The sensor may comprise a blocking layer formed of a plurality of casein micelles that may comprise a number of functional groups including primary amines. When functionalized with an amine-reactive-crosslinker, a linkage group is provided in the position of the primary amine for allowing binding thereto. The sensor may further comprise at least one biorecognition element that is functionalized with a linker molecule or that has been functionalized through chemical reaction using, for example, specific enzymes, whereby the functionalization is compatible with the linkage group. This should be understood as, for example, if an amine-to-sulfhydryl crosslinker is used to provide the linkage group, the functionalization should provide a free thiol group and so on for alternative click-chemistries. When the sensor comprising the linkage groups and the at least one biorecognition element are brought into contact, a bond is formed between the linkage group and the at least one biorecognition element, thereby linking the at least one biorecognition element to the casein micelle and thereby the sensor. The biorecognition element may be designed to be able to selectively or specifically bind to the at least one target molecule. The biorecognition element may comprise a functional group compatible with the linker molecule without chemical modification. When the sensor is brought into contact with at least one such biorecognition element it may bind the linkage group.

In the context of this specification, the expression "selective binding" or "selectively bind" may refer to the ability of a probe or a biorecognition element to bind or have a high affinity to a similar or otherwise related group of targets, such as proteins of the same protein family or different variants of the same gene or several RNA-transcripts of the same gene.

In the context of this specification, the expression of "specifically binding" or "specifically bind" may refer to the ability of a probe or a biorecognition element to bind a single target specifically, such as a single protein even in the presence of members of the same protein family, or a single gene variant in the presence of other variants.

The biorecognition element may be any biorecognition element suitable for a target molecule. If the target molecule is single-stranded DNA, the biorecognition element may be a functionalized DNA oligonucleotide or aptamer, such as a thiolated DNA oligonucleotide or aptamer, or if the target molecule is a protein, the biorecognition element may be a functionalized antibody, such as a biotinylated antibody or aptamer. In one embodiment, the biorecognition element is selected from a group consisting of a functionalized oligonucleotide probe, a functionalized nucleotide probe, a functionalized DNA probe, a functionalized RNA probe, an antibody, a functionalized antibody, an bispecific antibody, a functionalized bispecific antibody, an antibody fusion protein, a functionalized antibody fusion protein, an antibody fragment thereof, a functionalized antibody fragment thereof, or a functionalized molecularly imprinted polymer. In one embodiment, the biorecognition element is selected from a group consisting of an oligonucleotide probe, a nucleotide probe, a DNA probe, an RNA probe, a functionalized oligonucleotide probe, a functionalized nucleotide probe, a functionalized DNA probe, a functionalized RNA probe, an antibody, a functionalized antibody, a bispecific antibody, a functionalized bispecific antibody, an antibody fusion protein, a functionalized antibody fusion protein, an antibody fragment thereof, a functionalized antibody fragment thereof, and a molecularly imprinted polymer, and a functionalized molecularly imprinted polymer In one embodiment, the sensor is a multiplexed sensor comprising a plurality of biorecognition elements independently selected from a group consisting of an oligonucleotide probe, a nucleotide probe, a DNA probe, an RNA probe, a functionalized oligonucleotide probe, a functionalized nucleotide probe, a functionalized DNA probe, a functionalized RNA probe, an antibody, a functionalized antibody, a bispecific antibody, a functionalized bispecific antibody, an antibody fusion protein, a functionalized antibody fusion protein, an antibody fragment thereof, a functionalized antibody fragment thereof, and a molecularly imprinted polymer, and a functionalized molecularly imprinted polymer.

In one embodiment, the sensor further comprises at least one biorecognition element bonded to the at least one linkage group that can selectively bind the at least one target molecule. In one embodiment, the sensor further comprises a plurality of functionalised biorecognition elements, bonded to a plurality of linkage groups, that can selectively bind the plurality of target molecules.

The disclosed method for determining the presence of at least one target molecule in a sample may comprise contacting the sensor with the sample thereby allowing the binding of the at least one target molecule thereto. The sample may be in liquid form. The sample may or may not be processed before the contacting with the sensor. Processing may comprise for example adjusting pH, adjusting temperature, fractionation, enrichment of the at least one target molecule, amplification of the at least one target molecule, homogenisation, filtration, concentration, preservation, or other common sample processing step. The processing steps depend on the type of sample and the at least one target molecule and are known to a person skilled in the art.

The sample may be a bodily fluid, such as whole blood, serum, plasma, urine, saliva, cerebrospinal fluid, lymph, interstitial fluid, mucus, synovial fluid, sweat, semen, breast milk, or a combination thereof. The sample may be for example reconstituted dried blood. The sample may be obtained from the subject as part of normal clinical practice. The sample may be provided by the subject as part of normal clinical practice. The sample may be obtained from the subject prior to the determining of the presence of the at least one target molecule in the sample. The sample may be obtained from a subject, that may be a mammal such as a dog, a cat, a rat, a primate, or a human. The sample may be obtained from a subject that is a human.

In one embodiment, the sample is a bodily fluid. In one embodiment, the sample is whole blood, serum, plasma, urine, saliva, cerebrospinal fluid, lymph, interstitial fluid, mucus, synovial fluid, sweat, semen, breast milk, or a combination thereof. In one embodiment, the sample is obtained from a mammal. In one embodiment, the sample is obtained from a human. In one embodiment, the sample is a bodily fluid obtained from a mammal. In one embodiment, the sample is a bodily fluid obtained from a human. In one embodiment, the sample is whole blood, serum, plasma, urine, saliva, cerebrospinal fluid, lymph, interstitial fluid, mucus, synovial fluid, sweat, semen, breast milk, or a combination thereof obtained from a human.

The method for determining the presence of at least one target molecule in a sample may comprise contacting the sensor with at least one detection probe. The at least one detection probe can selectively or specifically bind to the at least one target molecule. Upon binding the at least one target molecule it may become bound to the sensor. The at least one detection probe may be functionalized for example with a further functional group or other modification. The at least one detection probe may be any detection probe suitable for the target molecule. In an embodiment, the at least one detection probe is selected from a group consisting of an oligonucleotide probe, a nucleotide probe, a DNA probe, an RNA probe, a functionalized oligonucleotide probe, a functionalized nucleotide probe, a functionalized DNA probe, a functionalized RNA probe, an antibody, a bispecific antibody, an antibody fusion protein, an antibody fragment thereof, and a molecularly imprinted polymer. In an embodiment, the at least one biorecognition element and the at least one detection probe are independently selected from a group consisting of selected from a group consisting of an oligonucleotide probe, a nucleotide probe, a DNA probe, an RNA probe, a functionalized oligonucleotide probe, a functionalized nucleotide probe, a functionalized DNA probe, a functionalized RNA probe, an antibody, a functionalized antibody, a bispecific antibody, a functionalized bispecific antibody, an antibody fusion protein, a functionalized antibody fusion protein, an antibody fragment thereof, a functionalized antibody fragment thereof, and a molecularly imprinted polymer, and a functionalized molecularly imprinted polymer. In an embodiment, the plurality of detection probes are independently selected from a group consisting of oligonucleotide probe, a nucleotide probe, a DNA probe, an RNA probe, a functionalized oligonucleotide probe, a functionalized nucleotide probe, a functionalized DNA probe, a functionalized RNA probe, an antibody, a functionalized antibody, a bispecific antibody, a functionalized bispecific antibody, an antibody fusion protein, a functionalized antibody fusion protein, an antibody fragment thereof, a functionalized antibody fragment thereof, and a molecularly imprinted polymer, and a functionalized molecularly imprinted polymer. In an embodiment, the plurality of biorecognition elements and the plurality of detection probes are independently selected from a group consisting of selected from a group consisting of an oligonucleotide probe, a nucleotide probe, a DNA probe, an RNA probe, a functionalized oligonucleotide probe, a functionalized nucleotide probe, a functionalized DNA probe, a functionalized RNA probe, an antibody, a functionalized antibody, a bispecific antibody, a functionalized bispecific antibody, an antibody fusion protein, a functionalized antibody fusion protein, an antibody fragment thereof, a functionalized antibody fragment thereof, and a molecularly imprinted polymer, and a functionalized molecularly imprinted polymer.

In the context of this specification the term "enzyme linked analysis" may refer to the process of contacting the sensor with an enzyme, and optionally an enzyme substrate. The enzyme linked analysis may comprise the use of an enzyme and a corresponding enzyme substrate that the enzyme catalyses to signal molecules. The enzyme linked analysis may comprise the use of an enzyme without a substrate, wherein the enzyme yields a signal molecule.

The method for determining the presence of the at least one target molecule in a sample may comprise subjecting the sensor to an enzyme linked analysis to react with or yield signal molecules. The enzyme linked analysis may comprise the use of an enzyme and a corresponding enzyme substrate.

The enzyme may catalyse the reaction of converting the enzyme substrate to the signal molecule. The converting may be for example oxidation. The enzyme may be part of the detection probe (a fusion protein) or the enzyme may comprise a recombinant region that is specific to a modification on the detection probe. The enzyme linked analysis may comprise providing the enzyme in a way where the amount of the enzyme is relative to the amount of the target molecule, thereby providing an accurate means of quantification. In one embodiment, the enzyme comprises horseradish peroxidase or alkaline phosphatase. In one embodiment, the detection probe is a biotinylated nucleotide probe, the enzyme is a Streptavidin-conjugated horseradish peroxidase, the enzyme substrate is 3,3',5,5'-tetramethylbenzidine, and the signal molecule is an oxidized or a reduced form of 3,3',5,5'-tetramethylbenzidine. In one embodiment, the detection probe is an antibody conjugated with horseradish peroxidase, the enzyme substrate is 3,3',5,5'-tetramethylbenzidine, and the signal molecule is an oxidized or a reduced 3,3',5,5'-tetramethylbenzidine.

The sensor and the method described above comprising the determining the concentration of the at least one target molecule in the sample, may be used to provide a diagnosis, monitor a disease or condition, for example, to track prognosis, remission, recurrence, and/or effectiveness of a treatment in the subject thereof. The disease or condition may be any disease or condition. The sensor and the method may enable quantifying diagnostic or prognostic biomarkers (target molecules). The sensor and the method may additionally be used as part of a treatment to decide further clinical tests or procedures for the subject, wherein the further diagnostic test may be selected from a group consisting of ultrasound, diagnostic x-ray, magnetic resonance imaging, immunohistochemistry, electrocardiogram, blood test, or biopsy, and wherein the treatment may be selected from a group consisting of drug therapy, surgery, chemotherapy, hormonal therapy, radiation therapy, biological therapy such as immunotherapy, small molecule therapy, or antibody therapy, or a combination thereof. When the sensor or the method is used to provide a diagnosis, monitor a disease or condition, for example, to track prognosis, remission, recurrence, and/or effectiveness of a treatment in the subject, or as part of a treatment, the use may comprise quantifying the at least one target molecule and comparing the quantitative value thereof to reference values. The reference values may be from a representative group of healthy subjects or subject with a condition or disease. It may be for example, that the quantitative value of the at least one target molecule in the sample is increased or decreased compared to values obtained from healthy subjects, or that the quantitative value of the at least one target molecule in the sample is increased or decreased compared to obtained from subjects with a condition or disease, or that the quantitative value of the at least one target molecule in the sample is increased or decreased compared to values from control samples. An increase or a decrease in the quantitative value(s) of the at least one target molecule, or the plurality of target molecules, may be indicative of a disease or condition, or indicative of a risk of developing a disease or condition, or indicative of a change of state in the disease or condition, such as remission or recurrence, or indicative of health, or indicative of effectiveness of treatment. A fold change difference, for example, 1.5 fold, a 2-fold, or a 3-fold increase or decrease in the quantitative value(s) of the at least one target molecule may be considered a biomarker indicative of a diagnosis, risk of disease or condition, remission, recurrence, and/or effectiveness of a treatment in the subject. The at least one target molecule may or may not be associated with a known disease or condition. The determining of the presence of the at least one target molecule in the sample may be carried out in vitro. The determining of the presence of the at least one target molecule in the sample may be more sensitive than alternative methods when using the sensor as disclosed. The determining of the presence of the at least one target molecule in the sample may be improved compared to alternative methods when using the sensor as disclosed. In one embodiment, the method is a method for determining a diagnosis, a prognosis, a remission, or a recurrence for a disease or condition comprising: determining in a biological sample obtained from a subject a quantitative value of at least one target molecule, comparing the quantitative value(s) of the at least one target molecule(s) to a control sample or to a control value, wherein an increase or decrease in the quantitative value(s) of the at least one target molecules compared to the control sample or value are indicative of a diagnosis, a prognosis, a remission, or a recurrence of a disease or condition. In one embodiment, the method is a method for determining a risk to develop a disease or condition comprising: determining in a biological sample obtained from a subject a quantitative value of at least one target molecule, comparing the quantitative value(s) of the at least one target molecule(s) to a control sample or to a control value, wherein an increase or decrease in the quantitative value(s) of the at least one target molecules compared to the control sample or value are indicative of a risk to develop a disease or condition.

The process of preparing a sensor for determining the presence of at least one target molecule in the sample may be used to prepare or produce a sensor. The sensor may be a multiplex sensor. In one embodiment, the HARM-structures are carbon nanostructures. In one embodiment, the HARM-structures are carbon nanotubes or carbon nanobuds. In one embodiment, the casein micelles or the blocking layer thereof are not treated with any additives. In one embodiment, the casein micelles or the blocking layer thereof are not treated with any additional substance. In one embodiment, the casein micelles or the blocking layer thereof are not mixed with any additional substance. In one embodiment, the casein micelles or the blocking layer thereof are not subjected to physical processing. In one embodiment, the plurality of casein micelles have an essentially uniform or non-uniform size. In one embodiment, the functionalization is done with an amine-to-sulfhydryl-crosslinker. In one embodiment, the process further comprises providing the sensor with at least one biorecognition element that can selectively or specifically bind the at least one target molecule, wherein the at least one biorecognition element is brought into contact with the sensor, thereby binding to the at least one linkage group.

With such a process, a sensor with at least one specific or selective biorecognition element for at least one target molecule attached is provided. Such a sensor may be used to determine the presence of at least one target molecule in a sample or as part of a method such as the one disclosed herein.

The present disclosure further relates to a kit for determining the presence of at least one target molecule in a sample. The kit comprises:
  a sensor as disclosed in the current disclosure and at least one biorecognition element that can selectively bind to the at least one target molecule, or a sensor as disclosed in the current specification with a biorecognition element bound to the linkage group;

at least one detection probe that can selectively bind the at least one target molecule; and instructions for use.

In one embodiment, the kit comprises: a sensor as disclosed in the current disclosure and at least one biorecognition element that can selectively bind to the at least one target molecule, or a sensor with a biorecognition element bound to the sensor thereof; and instructions for use.

Some of the materials required for the quantification or determination may be common lab materials or reagents and may not be comprised in the kit, such as pipette tips, tubes, purified water, or buffers. Some reagents for the quantification or determination may have to be obtained separately, such as an enzyme or an enzyme substrate for an enzyme linked analysis, or the means to measure the electrical signal.

The method and process thereof as disclosed in the current specification has the added utility of providing a sensitive sensor for determining the presence of at least one target molecule in a sample. The sensitivity is achieved through using a plurality of casein micelles as the blocking layer. The casein micelles have the feature of being antifouling molecules that prevent the non-specific binding of molecules in said sample, thereby allowing the sensor to have a low background signal. The casein micelles have the feature of binding only the layer formed of HARM-structures and other casein micelles, forming a firm blocking layer while still allowing the formation of cavities that allow the passage of signal molecule(s) to the layer formed of HARM-structures. Further, the casein micelles comprise surface functional groups, such as primary amines, that may be altered through click-chemistry without impeding their ability of bind other casein micelles or the layer formed of HARM-structures, allowing the functionalization of said surface functional groups to attach, for example, biorecognition elements. Altogether, the blocking layer comprising a plurality of casein micelles provides the added utility of blocking non-specific binding, allowing specific binding to functionalized groups, and forming cavities that allow the passage of signal molecule(s) to the layer formed of HARM-structures thereby providing a sensitive sensor for determining the presence of at least one target molecule in a sample.

EXAMPLES

Reference will now be made in detail to various embodiments, an example of which is illustrated in the accompanying drawings.

The description below discloses some embodiments in such a detail that a person skilled in the art is able to utilize the embodiments based on the disclosure. Not all steps or features of the embodiments are discussed in detail, as many of the steps or features will be obvious for the person skilled in the art based on this specification.

For reasons of simplicity, item numbers will be maintained in the following exemplary embodiments in the case of repeating components.

Figure 1A:
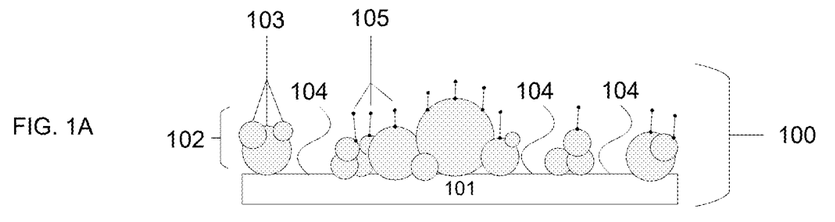
FIGS. 1A, 1B and 1C illustrates schematic views of example embodiments of a sensor for determining the presence of at least one target molecule in a sample according to example embodiments.
Figure 1B:
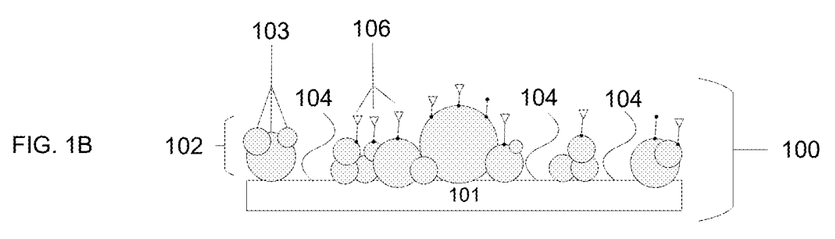
Figure 1C:
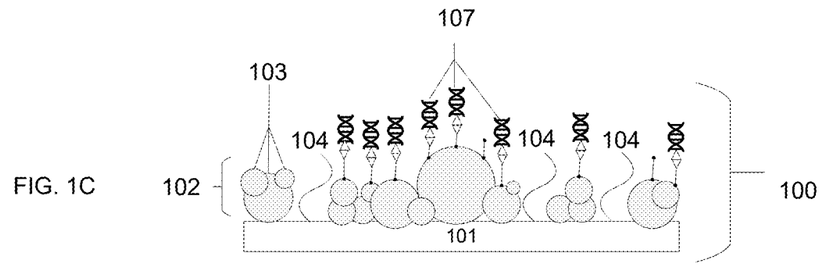

FIG. 1A-C illustrates schematic views of example embodiments of a sensor for determining the presence of at least one target molecule in a sample according to example embodiments.

FIG. 1A) illustrates a sensor 100 for determining the presence of at least one target molecule in a sample that comprises a layer formed of HARM-structures 101 and a blocking layer 102 on the layer formed of HARM-structures 101. The blocking layer 102 is formed of casein micelles 103. The layer of HARM-structures 101 is configured to generate an electrical signal when in contact with signal molecules indicating the presence of the at least one target molecule when an electrical potential is applied to the layer formed of HARM-structures 101, wherein the magnitude of the electrical signal correlates with the concentration of the at least one target molecule in the sample. Cavities 104 are formed between the casein micelles 103 for allowing the signal molecules to diffuse through the blocking layer 102 to the layer formed of HARM-structures 101 such as to generate the electrical signal. The casein micelles 103 comprise primary amines 105.

FIG. 1 B) illustrates a sensor 100 for determining the presence of at least one target molecule in a sample that comprises a layer formed of HARM-structures 101 and a blocking layer 102 formed of casein micelles 103, wherein in cavities 104 are formed between the casein micelles 103. The casein micelles 103 comprise primary amines 105, wherein at least part of the primary amines 105 are functionalized with an amine-reactive crosslinker thereby providing at least one linkage group 106.

FIG. 1 C) illustrates a sensor 100 for determining the presence of at least one target molecule in a sample that comprises a layer formed of HARM-structures 101 and a blocking layer 102 formed of casein micelles 103, wherein in cavities 104 are formed between the casein micelles 103. The casein micelles 103 comprise primary amines 105, wherein at least part of the primary amines 105 are functionalized with an amine-reactive crosslinker thereby providing at least one linkage group 106. The sensor 100 is brought into contact with at least one biorecognition element 107. The at least one biorecognition element 107 is functionalized in such a way as to bind the linkage group(s) 106 and thereby the sensor. The biorecognition element 107 can selectively bind the at least one target molecule.

Referring to FIG. 1A-C, the casein micelles 103 that form the blocking layer 102 form cavities 104. It is possible for the casein micelles to be in an arrangement where they do not form a cavity, for example, because the casein micelles are too large or the packing density is too high. The casein micelles 103 are antifouling molecules and would otherwise prevent, for example, the binding of a biorecognition element 107, to the casein micelles 103. However, when the casein micelles 103 are functionalized with an amine reactive crosslinker a linkage group 106 is provided that can form a bond with the biorecognition element 107.

Figure 2A:
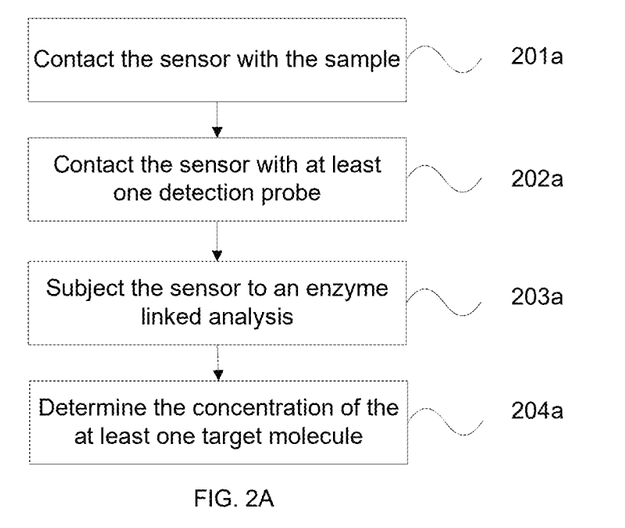
FIGS. 2A and 2B shows a schematic flow chart of a method for determining the presence of at least one target molecule in a sample according to example embodiments.
Figure 2B:
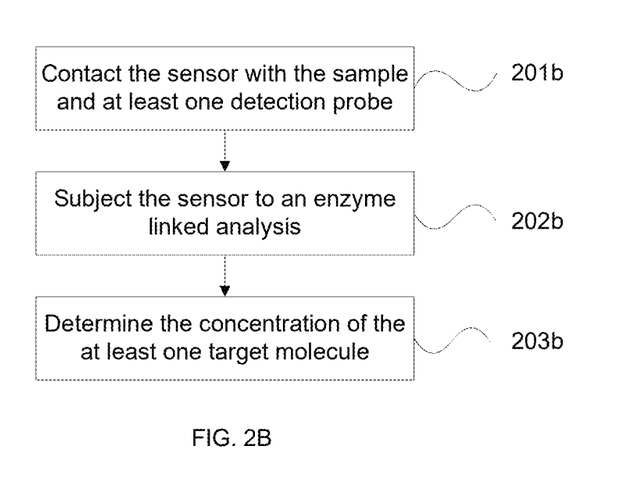

FIG. 2 shows schematic flow charts of a method for determining the presence of at least one target molecule in a sample according to example embodiments.

FIG. 2A) In one embodiment, the sensor, such as the one described in FIG. 1C, is contacted with the sample in operation 201a. The sensor comprises a layer of HARM-structures, a blocking layer, and at least one biorecognition element capable of binding the at least one target molecule. When the sensor is contacted and incubated with a sample comprising the target molecule, the target molecule binds the at least one biorecognition element and thereby the sensor. The sensor may then be washed. In operation 202a, the sensor is contacted with at least one detection probe and incubated. The at least one detection probe is capable of specifically binding the at least one target molecule and thereby binds the sensor. The sensor may now be washed to remove unbound detector probes. In operation 203a, the sensor is subjected to an enzyme linked analysis. In the enzyme linked analysis, the sensor is brought into contact with an enzyme capable of binding the at least one detector probe, thereby binding it to the sensor. The sensor may now be washed to remove unbound enzyme. Then, an enzyme substrate may be added. The enzyme will catalyse a chemical reaction, such as oxidation, transforming the enzyme substrate to the signal molecules. For example, the signal molecule may be an oxidised enzyme substrate. When the signal molecules are in contact with the layer of HARM-structures (FIG. 1, 101) of a sensor (FIG. 1, 100) to which an electrical potential is applied, an electrical current or electrical signal is generated. In operation 204a, the concentration of the at least one target molecule can be determined. When the signal molecules are in contact with the layer of HARM-structures (FIG. 1, 101) of a sensor (FIG. 1, 100) to which an electrical potential is applied, an electrical signal is generated. The electrical signal or electrical current may be measured with means to measure electrical signal and quantified. The magnitude of the electrical signal correlates with the concentration of the at least one target molecule in the sample.

FIG. 2 B) In one embodiment, the sensor is contacted with the sample and detection probe in operation 201b. The sample and the at least one detection probe may be premixed and then the mixture may be brought into contact with the sensor and incubated. The at least one target molecule and the detection probe bind the sensor thereof. The sensor may then be washed. In operation 202b, the sensor is subjected to an enzyme linked analysis. In the enzyme linked analysis, the sensor is brought into contact with an enzyme capable of binding the at least one detector probe, thereby binding it to the sensor. In operation 203b, the concentration of the at least one target molecule can be determined with means to detect the electrical signal.

Figure 3A:
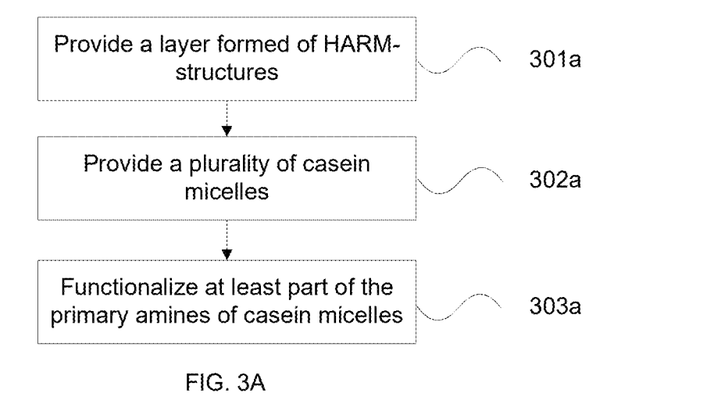
FIGS. 3A and 3B shows a schematic flow chart of a process of preparing a sensor for determining the presence of at least one target molecule in a sample according to example embodiments.

FIG. 3A) shows a schematic flow chart of a process of preparing a sensor for determining the presence of at least one target molecule in a sample according to an example embodiment. A layer formed of HARM-structures is provided in operation 301a, the HARM-structures may be free-standing or attached to a base or frame. The HARM-structures may be, for example, carbon nanotubes. In operation 302a, a solution comprising a plurality of casein micelles is provided. The solution is brought into contact with the layer formed of HARM-structures, providing a blocking layer. The casein micelles comprise primary amines that can be, in operation 303a, functionalized with an amine-reactive crosslinker, thereby providing at least one linkage group for allowing binding thereto.

Figure 3B:
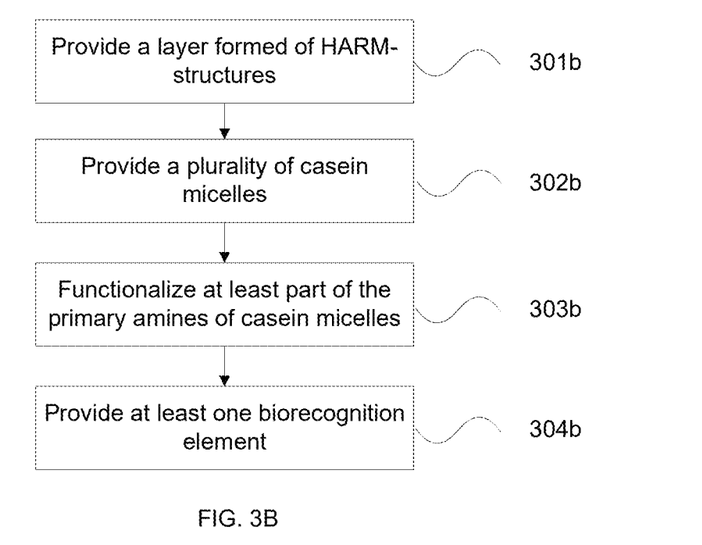

FIG. 3 B) shows a schematic flow chart of a process of preparing a sensor for determining the presence of at least one target molecule in a sample according to an example embodiment. A layer formed of HARM-structures is provided in operation 301b, the HARM-structures may be free-standing or attached to a base or frame. The HARM-structures may be, for example, carbon nanotubes. In operation 302b, a solution comprising a plurality of casein micelles is provided. The solution is brought into contact with the layer formed of HARM-structures, providing a blocking layer. The casein micelles comprise primary amines that can be, in operation 303b, functionalized with an amine-reactive crosslinker, thereby providing at least one linkage group for allowing binding thereto. In operation 304b the at least one biorecognition element is brought into contact with the sensor and incubated. The at least one biorecognition element is compatible with the linkage group, for example it is functionalized. The at least one biorecognition element binds the at least one linkage group and becomes immobilized to the sensor thereof. The sensor may then be washed with an appropriate buffer. The sensor now comprises the biorecognition element, that can bind the at least one target molecule.

Example 1—Preparing and Testing Sensors for Determining the Presence of at Least One Target Molecule In this example a series of experiments were performed in order to test how different layers formed of HARM-structures are blocked with different types of blocking layers and what the effect of the blocking layer has on the non-specific binding of biomolecules.

Non-specific binding of biomolecules affects the sensitivity of the sensor, by producing a larger background signal. The non-specific binding of biomolecules was evaluated by incubating the sensors with detection probes and Streptavidin-conjugated Poly-HRP. The detection probe of this example was biotinylated DNA, allowing the binding of Streptavidin-conjugated Poly-HRP. Non-specific binding of either the detection probe and/or Streptavidin-conjugated Poly-HRP gives rise to high background currents.

Firstly, the sensors to be tested were prepared. Carbon nanotubes (CNT, Canatu) and high-aspect ratio graphene (3D-Graphene, Integrated Graphene) were used as the HARM-structures to form the layer formed of HARM-structures. Then different blocking layers were formed on the layer formed of either carbon nanotubes (CNT) or graphene nanostructures. The following samples were formed:

TABLE 1

Prepared sensors

| | Layer formed of HARM structures | Blocking layer |
|---|---|---|
| Reference sensor 1 | carbon nanotubes | — |
| Reference sensor 2 | graphene | — |
| Sensor 1 | carbon nanotubes | Casein small |
| Sensor 2 | carbon nanotubes | Casein large |
| Sensor 3 | graphene | Casein small |
| Comparative sensor 1 | carbon nanotubes | Bovine serum albumin |
| Comparative sensor 2 | carbon nanotubes | Lignin |

Reference sensors had no blocking layer on the layer formed of HARM-structures. The blocking layer labelled "Casein small" was formed with a blocking solution of casein micelles with diameter mainly ranging between 2-10 nm.

The blocking the layer labelled "Casein large" was formed with a blocking solution of casein micelles having their diameter non-determined except the solution being filtered with 0.45 μm filter. This blocking solution contained casein micelles with diameters that are naturally occurring in milk, ranging all the way up to 450 nm and the size was then cut-off due to filtering. A comparative sensor was formed by using bovine serum albumin (BSA) as the blocking layer and another comparative sensor was formed by using a blocking solution of lignin in dimethyl sulfoxide solution. The different sensor types were formed in triplicates (n=21).

The sensor is incubated with the blocking solution for 2 hours. After incubation the prepared sensors were washed to rinse off excess blocking molecules and were then dried in air.

Next, the sensors were incubated with biotinylated detection probe DNA solution (2.5 μM concentration prepared into 1× PBS), followed by washing, and then the sensors were incubated with Streptavidin conjugated Poly-HRP and washed.

Lastly, the sensors were brought into contact with 3,3',5,5'-tetramethylbenzidine (TMB) containing Liquid Substrate System "electrolyte", into which an Ag/AgCl pseudoreference electrode and a carbon rod counter electrode were placed. The electrochemical reduction reaction of oxidized TMB catalysed by Poly-HRP were analysed with a Reference 1010E potentiostat (Gamry) by using Chronoamperometry at −0.2 V (vs. Ag/AgCl) holding potential. Current was measured for 60 seconds, and reduction current data was analysed from a time-point where the system had already reached steady state (t=55s). The measurements were made with triplicate sensors, obtaining average value for the sensor types. For the background measurements, the recorded current was arising from non-specific binding of the detection probe and/or Streptavidin conjugated Poly-HRP due to them being prepared into clean buffer solution (1× PBS) absent of target molecules or interfering molecules. Accordingly, that experimental procedure highlights the sensor's signal component arising from non-specific binding.

To obtain a signal-to-background value, the sensors (n=21) were blocked with small casein in similar manner as introduced previously and were then functionalized to immobilize biorecognition element onto them. These sensors were then incubated with target DNA prior to administration of detection probe and Streptavidin conjugated Poly-HRP. In the FIG. 4, the signals arising from these sensors are the ones labelled as "Target".

After blocking of the sensors, N-γ-maleimidobutyryl-oxysulfosuccinimide ester (Sulfo-GMBS) in PBS solution was drop-casted onto the sensors and the formed system was incubated to allow the click-chemistry reaction between the N-hydroxysuccinimide ester (NHS) provided by the Sulfo-GMBS and primary amine take place.

Next, the sensors were washed and then biorecognition element (here thiolated DNA) solution (2.5 µM concentration prepared into PBS) was incubated on the sensors to allow the click-chemistry reaction between Sulfo-GMBS' maleimide group and the biorecognition elements thiol group take place. After incubation the sensors were washed, and the sensors were incubated with the sample to allow the biorecognition element to hybridize with the target molecule (here DNA) (5 nM concentration prepared into 1× PBS), and the sensor was then washed.

Finally, the biotinylated detection probe and Streptavidin conjugated Poly-HRP were incubated on the sensors similarly as stated previously. Lastly, the sensors were recorded in TMB Liquid Substrate System "electrolyte" and analysis was done as stated previously.

Figure 4:
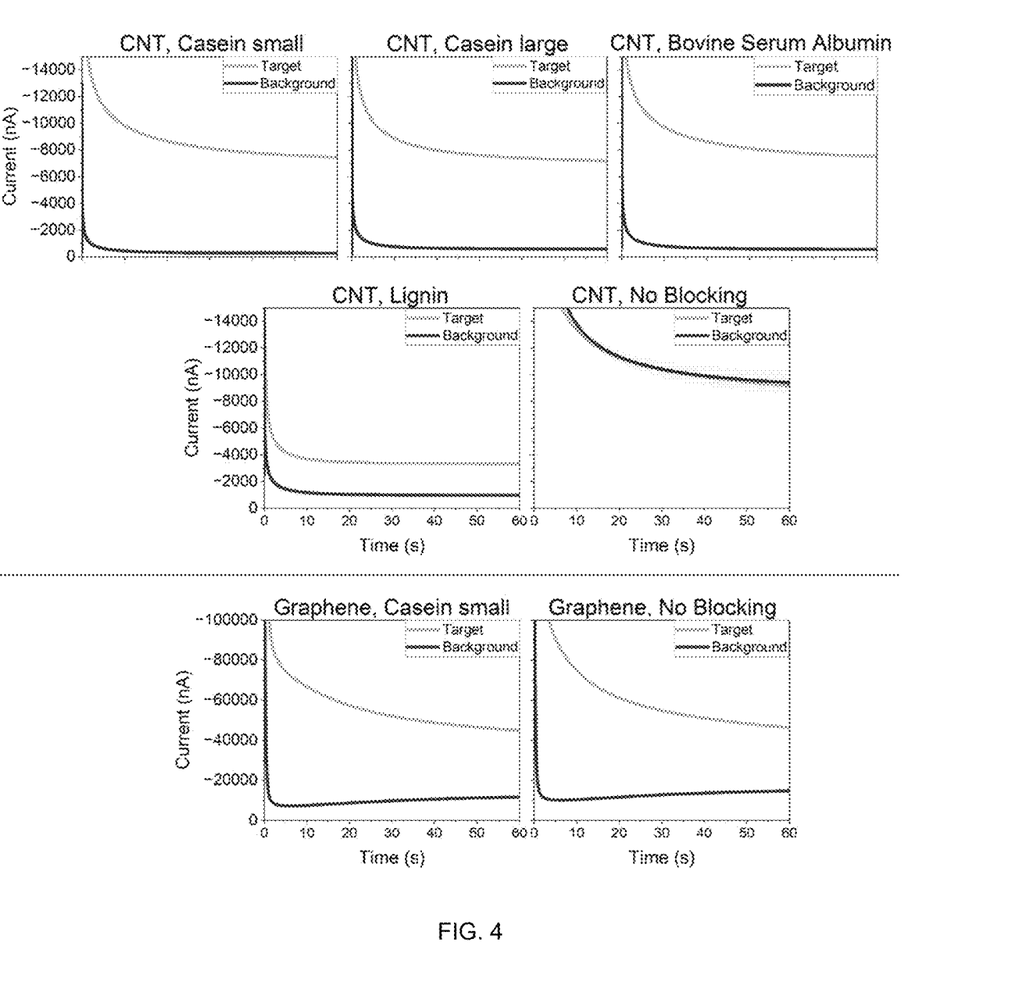
FIG. 4 shows experimental results related to example 1.
Figure 5:
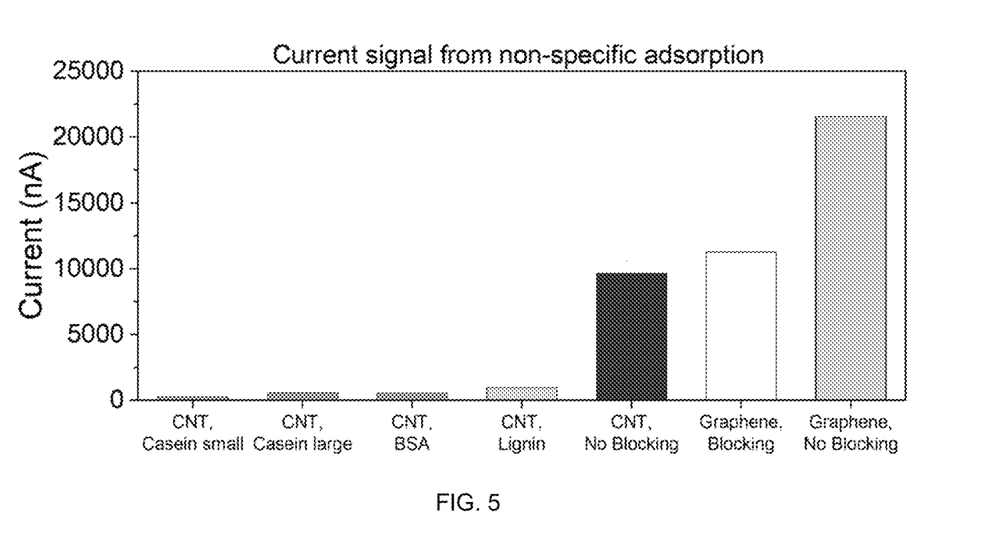
FIG. 5 shows experimental results related to example 1.
Figure 6:
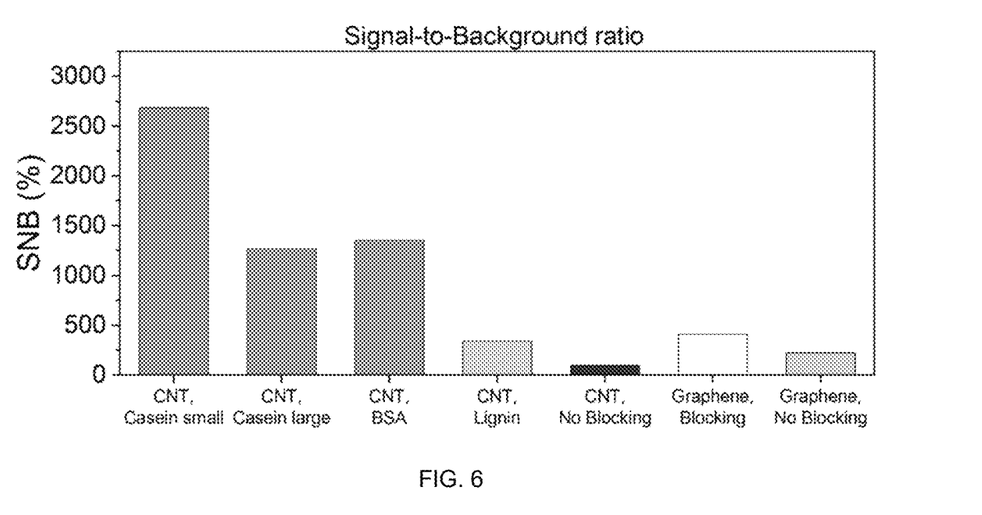
FIG. 6 shows experimental results related to example 1.

The results are presented in FIGS. 4-6.

FIG. 4. presents the chronoamperometry traces of the studied sensors. The target current signal is shown in grey, and the background signal is shown in black. The x-axis displays the measured current in nA and y-axis is time in seconds. The displayed measured current reflects an average of measurements from triplicate sensors of each studied type. As seen in FIG. 4, "CNT, Casein small" sensors show the lowest background signal compared to the other sensors, more specifically approximately 50% smaller compared to "Casein large" and "BSA" blocking. Lignin performed poorly as a blocking layer, showing a high background signal and low target signal. The measured current of "Graphene, Casein small" has a 40-fold increase in background current compared to "CNT, Casein small", indicating that carbon nanotubes as the material of the layer formed of HARM-structures are more sensitive and that the detection probe and/or Streptavidin conjugated Poly-HRP remain stuck inside the 3D-graphene despite effective washing.

In FIG. 5 is presented the current signal from non-specific binding of DNA and protein. The current signal was larger for non-blocked sensors, irrespective of the material of the layer formed or HARM-structure material. For carbon nanotubes, the blocking layer labelled as "Casein small" provided 52% more efficient blocking compared to "Casein large" and 50% more efficient blocking compared to BSA. Lignin was the least efficient in blocking the non-specific binding of DNA and proteins, giving rise background currents with magnitude of 346% compared to "casein small" sensors.

In FIG. 6 the signal-to-background (SNB) ratio between the target and background signal is visualized. The SNB was significantly improved by blocking the non-specific binding, and the SNB ratio was highest for sensors blocked with "Casein small", arising mainly from significantly improved blocking efficiency against non-specific binding of biomolecules. The SNB of "Casein small" samples approximately doubled compared to "Casein large" (2.12-fold) or BSA (1.98-fold) blocking, whereas the SNB improvement compared to lignin blocking (7.82-fold) and non-blocked sensors (27.2-fold) was even more pronounced.

It is obvious to a person skilled in the art that with the advancement of technology, the basic idea may be implemented in various ways. The embodiments are thus not limited to the examples described above; instead, they may vary within the scope of the claims.

The embodiments described hereinbefore may be used in any combination with each other. Several of the embodiments may be combined together to form a further embodiment. A sensor, a method, a process, a use, or a kit may comprise at least one of the embodiments described hereinbefore. It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items. The term "comprising" is used in this specification to mean including the feature(s) or act(s) followed thereafter, without excluding the presence of one or more additional features or acts.

The invention claimed is:

1. A sensor for determining presence of at least one target molecule in a sample, wherein the sensor comprises:
   i. a layer formed of high aspect ratio molecular structures (HARM-structures), wherein the layer formed of HARM-structures is configured to generate an electrical signal when in contact with signal molecules indicating the presence of the at least one target molecule when an electrical potential is applied to the sensor, wherein the magnitude of the electrical signal correlates with the concentration of the at least one target molecule in the sample; and
   ii. a blocking layer on the layer formed of HARM-structures, wherein the blocking layer is formed of a plurality of casein micelles, wherein:
   the casein micelles comprise primary amines, wherein at least part of the primary amines is functionalized with an amine-reactive crosslinker thereby providing at least one linkage group for allowing binding thereto, and
   cavities are formed between the plurality of casein micelles for allowing the signal molecules to diffuse through the blocking layer to the layer formed of HARM-structures such as to generate the electrical signal.

2. The sensor of claim 1, wherein the HARM-structures are carbon nanostructures.

3. The sensor of claim 1, wherein the casein micelles are of essentially uniform size or of non-uniform size.

4. The sensor of claim 1, wherein at least 60%, or at least 70%, or at least 80%, or at least 90%, or at least 95%, or at least 99% or essentially all of the casein micelles have a diameter in the range of 0.5-30 nm, or 0.7-20 nm, or 1-15 nm, or 2-10 nm.

5. The sensor of claim 1, wherein the sensor further comprises at least one biorecognition element, bonded to the at least one linkage group, that can selectively bind the at least one target molecule.

6. A method for determining the presence of at least one target molecule in a sample, comprising:
   contacting the sensor according to claim 5 with the sample, thereby allowing the binding of the at least one target molecule thereto;
   contacting the sensor with at least one detection probe that can selectively bind to the at least one target molecule thereby allowing the binding of the at least one detection probe to the at least one target molecule;
   subjecting the sensor to an enzyme linked analysis to yield signal molecules, which indicate the presence of the at least one target molecule, wherein the signal molecules diffuse through the blocking layer to the layer formed of HARM-structures, whereby an electrical signal is generated and quantified with means to measure the electrical signal; and
   determining the concentration of the at least one target molecule in the sample based on the quantified electrical signal.

7. The method of claim 6, wherein the at least one detection probe and at least one biorecognition element that can selectively bind to the at least one target molecule are independently selected from a group consisting of an oligonucleotide probe, a nucleotide probe, a DNA probe, an RNA probe, a functionalized oligonucleotide probe, a functionalized nucleotide probe, a functionalized DNA probe, a functionalized RNA probe, an antibody, a functionalized antibody, a bispecific antibody, a functionalized bispecific antibody, an antibody fusion protein, a functionalized antibody fusion protein, an antibody fragment thereof, a functionalized antibody fragment thereof, a molecularly imprinted polymer, and a functionalized molecularly imprinted polymer.

8. The method of claim 6 wherein the at least one target molecule is selected from a group consisting of: a single stranded DNA-molecule, a single stranded RNA-molecule, a double stranded DNA-molecule, a double stranded RNA-molecule, a protein, a peptide, a lipid, a hormone, a pathogen, and a pharmaceutical compound.

9. The method of claim 6, wherein the sample is a bodily fluid.

10. The method of claim 6, wherein the sample is obtained from a mammal.

11. A process of preparing a sensor according to claim 1 for determining presence of at least one target molecule in a sample, comprising:
   i. providing a layer formed of HARM-structures;
   ii. providing a blocking layer on the layer formed of HARM-structures, wherein the blocking layer is formed of a plurality of casein micelles, wherein the casein micelles comprise primary amines;
   iii. functionalizing at least part of the primary amines with an amine-reactive crosslinker, thereby providing at least one linkage group for allowing binding thereto; and
   thereby providing the sensor according to claim 1.

12. The process of claim 11, wherein the casein micelles are of essentially uniform or non-uniform size.

13. The process of claim 11, wherein at least 60%, or at least 70%, or at least 80%, or at least 90%, or at least 95%, or at least 99% or essentially all of the casein micelles have a diameter in the range of 0.5-30 nm, 0.7-20 nm, or 1-15 nm, or 2-10 nm.

14. The process of claim 11, wherein process further comprises providing the sensor with at least one biorecognition element that can selectively bind to the at least one target molecule, wherein the at least one biorecognition element and is brought into contact with the sensor, thereby binding to the at least one linkage group.

15. A kit for determining presence of at least one target molecule in a sample, wherein the kit comprises:
   a sensor according to claim 1 and at least one biorecognition element that can selectively bind to the at least one target molecule;
   at least one detection probe that can selectively bind the at least one target molecule; and
   instructions for use.

* * * * *